3,017,425
**METHOD FOR THE PREPARATION OF MONOCY-
ANOETHYLFORMAMIDE**
Newman M. Bortnick, Oreland, Pa., assignor to Rohm & Haas Company, Philadelphia, Pa., a corporation of Delaware
No Drawing. Filed Mar. 19, 1958, Ser. No. 722,399
6 Claims. (Cl. 260—465.4)

This invention deals with a method for the preparation of monocyanoethylformamide. It further concerns a method for the preparation of monocyanoethylformamide in high yields and in which a by-product formed is recycled and used in the formation of more monocyanoethylformamide.

The present process is conducted by heating dicyanoethylformamide at temperatures of about 140° to 250° C. and higher, 140° to 250° C. being preferred. Pressures in the range of 0.01 mm. up to atmospheric are satisfactory with 0.01 to 50 mm. being preferred because yields repeatedly approach a maximum in this range.

The reaction is conducted preferably in the presence of a basic catalyst or alternatively no catalyst at all. It is critical that no acid ingredients be present since in the presence of acids, the desired reaction does not occur. There may be employed as basic catalysts in the present reaction, carbonates, hydroxides, oxides, alkoxides, and carboxylates of the alkali metals and the alkaline earths. Typical catalysts that may be employed include sodium carbonate, barium carbonate, potassium hydroxide, lithium hydroxide, calcium oxide, strontium oxide, sodium methoxide, potassium ethoxide, sodium acetate, calcium propionate, potassium acrylate, lithium butyrate, and the like. It is preferred to employ the stronger basic agents such as the alkoxides, oxides, and hydroxides, mentioned above.

The starting material used in this invention, dicyanoethylformamide, is commonly prepared by the reaction between ammonia and acrylonitrile to form dicyanoethylamine which in turn is reacted with formic acid with the evolution of water or with methyl formate with the evolution of methanol. In the present reaction, monocyanoethylformamide is prepared by treating dicyanoethylformamide in the way previously described and as a by-product thereof, there is formed acrylonitrile. This acrylonitrile may then be recycled to be reacted with ammonia to start the cycle going all over again. This insures yields that are consistently substantially quantitative. Since the present process produces both the desired monocyanoethylformamide directly, plus acrylonitrile, which is used in processes to form dicyanoethylformamide which in turn produces more monocyanoethylformamide, the yields and concurrent economies of the present process are industrially advantageous. The monocyanoethylformamide thus produced may be reacted with dicyandiamide to give β-formamidopropioguanamine which may be reacted with formaldehyde to form water-soluble polymers which when cured give interesting films and good adhesives of economic importance. Furthermore, monocyanoethylformamide may be hydrolyzed to β-alanine on heating with dilute aqueous acids or bases. β-Formamdopropioguanamine may be hydrolyzed to β-aminopropioguanamine which may be coreacted with other nitrogenous components and formaldehyde to give water-dispersible polymers useful in the coatings field.

The present invention may be more fully understood from the following illustrative examples which are offered by way of illustration and not by way of limitation. Parts by weight are used throughout.

*Example 1*

There are added to a reaction vessel, 62 parts of dicyanoethylformamide and 0.1 part of sodium methoxide. The pressure of the system is adjusted to 1 to 3 mm. of mercury and the system is heated in the temperature range of 140° to 250° C. There is distilled over and collected, the product, monocyanoethylformamide, which is redistilled at 141° to 143° C. at 0.2 mm. absolute pressure. The product has an $n_D^{25}$ value of 1.4669. It contains 48.6% carbon (49.0% theoretical), 6.4% hydrogen (6.1% theoretical), and 28.4% nitrogen (28.6% theoretical). The yield of desired product is in excess of 97%.

The above reaction is repeated in the presence of sodium acetate, lithium hydroxide, and barium hydroxide. In each instance, monocyanoethylformamide is produced in high yields.

*Example 2*

There are added to a reaction vessel 0.3 part of prepared calcium carbonate and 48.6 parts of dicyanoethylformamide. The reaction system is adjusted to a pressure of 1 mm. and the system is heated to the reflux temperature. Monocyanoethylformamide is collected as the distillate and identified from its physical constants as in Example 1. The yield of desired product is in excess of 97%.

The above reaction is repeated using potassium ethoxide, sodium propionate, and barium hydroxide as catalysts. In each instance, a high yield of monocyanoethylformamide is produced.

*Example 3*

There are added to a reaction vessel, 57.4 parts of dicyanoethylformamide. The reaction system is adjusted to below 1 mm. absolute pressure and the system heated to reflux. Monocyanoethylformamide is collected as the distillate and identified by its physical constants as in Example 1. The yield of monocyanoethylformamide is quantitative.

I claim:

1. A method for the preparation of monocyanoethylformamide in a reaction medium substantially free of hydrolyzing agents which consists essentially of heating dicyanoethylformamide in the temperature range of about 140° to 250° C. at a pressure of about 0.01 mm. up to atmospheric and distilling the monocyanoethylformamide formed.

2. A method for the preparation of monocyanoethylformamide in a reaction medium substantially free of hydrolyzing agents which consists essentially of heating dicyanoethylformamide in the substantial absence of acidic agents in the temperature range of about 140° to 250° C. at a pressure of about 0.01 mm. up to atmospheric and distilling the monocyanoethylformamide formed.

3. A method for the preparation of monocyanoethylformamide in a reaction medium substantially free of hydrolyzing agents which consists essentially of heating dicyanoethylformamide in the temperature range of about 140° to 250° C. at a pressure of about 0.01 mm. up to about 50 mm. and distilling the monocyanoethylformamide formed.

4. A method for the preparation of monocyanoethylformamide in a reaction medium substantially free of hydrolyzing agents which consists essentially of heating dicyanoethylformamide in the substantial absence of acidic agents in the temperature range of about 140° to 250° C. at a pressure of about 0.01 mm. up to 50 mm. and distilling the monocyanoethylformamide formed.

5. A method for the preparation of monocyanoethylformamide in a reaction medium substantially free of hydrolyzing agents which consists essentially of heating dicyanoethylformamide in the temperature range of about 140° to 250° C. at a pressure of about 0.01 up to atmospheric in the presence of a basic catalyst from the group consisting of carbonates, hydroxides, oxides, alkoxides, and carboxylates of the alkali metals and alkaline earths, and distilling the monocyanoethylformamide formed.

6. A method for the preparation of monocyanoethylformamide in a reaction medium substantially free of hydrolyzing agents which consists essentially of heating dicyanoethylformamide in the temperature range of 140° to 250° C. at a pressure of about 0.01 to about 50 mm. in the presence of sodium methoxide, and distilling the monocyanoethylformamide formed.

References Cited in the file of this patent

UNITED STATES PATENTS

| | | |
|---|---|---|
| 2,798,059 | Guth et al. | July 2, 1957 |
| 2,885,435 | Pursglove | May 5, 1959 |
| 2,927,126 | Pursglove | Mar. 1, 1960 |